United States Patent [19]

Nakatsuka et al.

[11] Patent Number: 5,464,910

[45] Date of Patent: Nov. 7, 1995

[54] EPOXY RESIN ADDUCT COMBINED WITH A BORATE ESTER AND PHENOLIC COMPOUND

[75] Inventors: Takuo Nakatsuka, Okayama; Tsuyoshi Toyota, Takamatsu; Mie Tanimoto, Marugame; Akiko Matsumoto, Sakaide, all of Japan

[73] Assignee: Shikoku Chemicals Corporation, Marugame, Japan

[21] Appl. No.: 171,681

[22] Filed: Dec. 22, 1993

[51] Int. Cl.⁶ .................................................. C08F 283/00
[52] U.S. Cl. ........................ 525/486; 525/489; 525/511; 525/534; 525/936; 528/91; 528/93; 528/94; 528/96
[58] Field of Search .................................. 525/486, 489, 525/511, 534, 936; 528/91, 93, 94, 96

[56] References Cited

U.S. PATENT DOCUMENTS

| | | | |
|---|---|---|---|
| 4,066,625 | 1/1978 | Bolger | 525/523 |
| 4,360,649 | 11/1982 | Kamio et al. | 525/507 |
| 4,410,457 | 10/1983 | Fujimura et al. | 252/508 |
| 5,169,473 | 12/1992 | Bertram et al. | 528/91 |
| 5,262,465 | 11/1993 | Ott et al. | 523/415 |
| 5,308,895 | 5/1994 | Gan et al. | 528/91 |
| 5,314,720 | 5/1994 | Gan et al. | 528/91 |

FOREIGN PATENT DOCUMENTS

| | | |
|---|---|---|
| 0197458 | 10/1986 | European Pat. Off. . |
| 0458502 | 11/1991 | European Pat. Off. . |

OTHER PUBLICATIONS

Patent Abstract of Japan, Oct. 18, 1991 JP-A-03 234727, vol. 16, No. 13, 1992.
Patent Abstract of Japan, Jan. 16, 1987 JP-A-63 178,125, Derwent Publications Ltd., London GB, AN-88-245768.
Patent Abstract of Japan, Oct. 12, 1988 JP-A-2 103,224, Derwent Publications Ltd., London, GB, AN-900160746.

*Primary Examiner*—Melvyn I. Marquis
*Assistant Examiner*—Randy Gulakowski
*Attorney, Agent, or Firm*—Sherman and Shalloway

[57] ABSTRACT

An epoxy resin composition having high epoxy curing property and sufficient storage stability, and an epoxy curing agent therefor. The curing agent or the cure accelerating agent obtained by treating the surfaces of (1) an epoxy adduct obtained by adding a nitrogen-containing heterocyclic compound, an aliphatic amine or an aromatic amine to an epoxy compound having one, two or more epoxy groups in one molecule, with (2) a boric acid compound or (3) a boric acid compound and a phenolic compound, exhibits high curing property and storage stability, and can be favorably used as a curing agent for the epoxy resin composition. The epoxy resin composition prepared by mixing the epoxy resin with (1) and (2) or (1) and (3), exhibits excellent curing property and storage stability.

13 Claims, No Drawings

EPOXY RESIN ADDUCT COMBINED WITH A BORATE ESTER AND PHENOLIC COMPOUND

BACKGROUND OF THE INVENTION

1. Field of the Invention

The present invention relates to a one-liquid type epoxy resin composition which can be stored for extended periods of time at ordinary temperature and cures quickly upon heating.

2. Prior Art

Epoxy resins of the two-liquid type have heretofore been used being comprised of an epoxy resin and a curing agent. The epoxy resin composition of the two-liquid type, however, require such operations as weighing, stirring and mixing at a time when they are used on the site. These operations involve such problems as a decreased operation efficiency, erroneous weighing, or disposal of excess amounts of the epoxy resin composition. At present, therefore, study has been extensively conducted in an effort to developing one-liquid type epoxy resin compositions that permit highly efficient workability on the site and can be stored for extended periods of time to substitute for the two-liquid type ones.

Development of a latent epoxy curing agent is a prerequisite for preparing the one-liquid type epoxy resin compositions. Known examples of the latent epoxy curing agent include dicyandiamide, carboxylic acid hydrazide, guanamine compounds, imidazole compounds. However, these latent curing agents cure the composition by heating at relatively high temperatures for extended periods of time. It has therefore been urged to provide a curing agent that activates at a low temperature and exhibits an excellent latent property.

As latent curing agents for curing epoxy resins at relatively low temperatures, there have been known an adduct of an alkylamine-and an epoxy resin, and an adduct of an imidazole compound and an epoxy resin (U.S. Pat. No. 4,066,625). These adducts only, however, are not enough for obtaining latency to a satisfactory degree. Therefore, additional modifications have been reported in which the surfaces thereof are coated with various compounds. For instance, there have been reported a method of encapsulation with an isocyanate compound (Japanese Laid-Open Patent Publication No. 268723/1986) and a method of surface treatment using an acidic substance (Japanese Patent Publication No. 18826/1990, Japanese Laid-Open Patent Publication No. 223027/1988).

However, the object has not yet been achieved to a sufficient degree by the above-mentioned attempts of reliably obtaining the latency by the surface treatment. For instance, the capsule film of the isocyanate compound is easily destroyed by the mechanical impact but is not sufficiently regenerated. Besides, the treatment with an acidic compound such as an organic acid, an inorganic acid, a resin acid or an aluminum compound does not help obtain stabilized latency.

SUMMARY OF THE INVENTION

The object of the present invention therefore is to develop an epoxy resin-curing agent which is free from the problems inherent in the prior art by using an epoxy resin adduct (hereinafter referred to as epoxy adduct) that is obtained by adding alkylamines, aromatic amines or nitrogen-containing heterocyclic compounds that are effective as low-temperature curing agents to an epoxy resin, and to develop a one-liquid type epoxy composition that can be stored for extended periods of time by utilizing the above curing agent.

Any one of a nitrogen-containing heterocyclic compound, an aliphatic amine or an aromatic amine is reacted with an epoxy compound having one or two or more epoxy groups in one molecule to obtain a product which is then pulverized thereby to afford an epoxy adduct in a powdery form. Surfaces of the powdery epoxy adduct are then coated with a boric acid compound represented by the following general formula to give a latent curing agent.

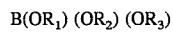

wherein $R_1$ to $R_3$ are hydrogen atoms, alkyl groups or aryl groups.

There is further proposed an epoxy resin composition using the above curing agent.

DETAILED DESCRIPTION OF THE INVENTION

The boric acid compound used in the present invention not only represents boric acid and boric acid ester but also includes the case where boric acid reacts with an alcohol to form a boric acid ester as well as the case where the boric acid ester is, on the other hand, changed into boric acid through hydrolysis. The boric acid compound used in the present invention further includes the case where there exists a so-called partial ester of boric acid. It has in practice been confirmed that when the surfaces of the adduct powder are coated with trimethyl borate, boric acid adheres on the surfaces of the epoxy adduct as confirmed by infrared absorption analysis.

When the surfaces of the very finely granular epoxy adduct are treated with a boric acid ester compound only, the boric acid ester is required in an increased amount, the epoxy-curing property is almost lost. Besides, the surface-treated adduct in an epoxy resin composition aggregates conspicuously upon the curing, causing the resin to be poorly cured. In the acid anhydride-curing system, furthermore, the storage stability is not still satisfactory by a single treatment of boric acid compounds.

In order to solve such problems, the present inventors have attempted to make an epoxy adduct, a boric acid compound, and a phenolic resin present in the epoxy resin composition, and have discovered the fact that the surfaces of the epoxy adduct are coated with the boric acid compound and the phenolic compound, and that the epoxy resin composition can be stably preserved. The inventors have further discovered the fact that even when the epoxy adduct is used as a curing agent or as a cure promoting agent for the acid anhydride-type curing agents, the epoxy resin composition can be stably stored yet exhibiting excellent curing property.

In order to impart latency, furthermore, the boric acid compound and the phenolic compound can be added during the preparation of the epoxy adduct so that they serve as homogeneous components of the epoxy adduct, instead of coating the surfaces of the epoxy adduct with the boric acid compound and the phenolic compound. However, the reaction product obtained by such a method exhibits epoxy-curing property which is very smaller than that of the surface-coated epoxy adduct.

The powdery epoxy adduct that is used for putting the present invention into practice has an average grain size of from about 0.1 to about 100 μm, and is obtained by pulverizing a product that is obtained by addition-reacting an epoxy compound with alkylamines, aromatic amines or nitrogen-containing heterocyclic compounds according to a conventional method.

The boric acid compound used in Examples of the present invention is represented by the following general formula,

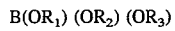

$$B(OR_1)(OR_2)(OR_3)$$

wherein $R_1$ to $R_3$ are hydrogen atoms, alkyl groups or aryl groups.

Representative examples thereof include boric acid, trimethyl borate, triethyl borate, tripropyl borate, tributyl borate, trioctyl borate, triphenyl borate and tricresyl borate, as well as esters formed by the partial alcohol-exchange reaction.

Representative examples of the nitrogen-containing heterocyclic compound used in Examples of the present invention include imidazole compounds such as imidazole, 2-ethyl-4-methylimidazole, 2-methylimidazole, 2-phenylimidazole, 2-undecylimidazole, 2-heptadecylimidazole, 2-phenyl-4-methyl-5-hydroxymethylimidazole and 2-phenyl-4,5-dihydroxymethylimidazole, as well as mercaptobenzothiazoles, melamine derivatives and the like. It is further allowable to use nitrogen-containing heterocyclic compounds having a 2-hydroxyethyl group on the nitrogen atom such as 1-(2-hydroxyethyl)-2-methylimidazole, 1-(2-hydroxyethyl)-2-phenylimidazole and diethanolamine, since they exhibit actions similar to those of the adduct.

Moreover, representative examples of the aliphatic amine compound and aromatic amine compound used in Examples of the present invention include a diethylenetriamine, a triethylenetetramine, a tetraethylenepentamine, an iminobispropylamine, a bis(hexamethylene)triamine, a diaminodiphenylmethane, a metaphenylenediamine and a 3,9-bis(3-aminopropyl)-2,4,8,10-tetroxaspiro[5,5]undecane Representative examples of the phenolic compound used for the epoxy resin composition of the present invention include compounds such as catechol, a 4-t-butyl catechol, pyrogallol, resorcinol, hydroquinone, phloroglucinol, bisphenol A, bisphenol F, dihydroxybiphenyl, dihydroxynaphthalene, a 1,1,1-tris(4-hydroxyphenyl) ethane and a bis(4-hydroxyphenyl) sulfone, a novolac-type or a resol-type phenol resin, and phenol-type polymers such as a poly(vinyl phenol).

Examples of the epoxy resin used for preparing the epoxy adduct or which are blended to the epoxy resin composition of the present invention include a bisphenol A-type epoxy resin, a bisphenol F-type resin, a cyclic aliphatic epoxy resin, a glycidyl ester-type epoxy resin, a glycidylamine-type epoxy resin, a hydantoin-type epoxy resin, a triglycidylisocyanurate, a phenylglycidylether and a butylglycidylether which may be used in one kind or in a combination of two or more kinds.

In putting the present invention into practice, described below are methods of preparing an epoxy resin composition using an epoxy adduct, a boric acid compound and a phenolic compound as essential components. The methods include (A) a method in which the epoxy adduct, the boric acid compound and the phenolic compound are separately added to the epoxy resin, and are kneaded using a planetary mixer or a roll mill, (B) a method in which a mixture product of the boric acid compound and the phenolic compound is prepared in advance, and the thus prepared product and the epoxy adduct are kneaded together with the epoxy resin, (C) a method in which the surfaces of the epoxy adduct are treated with the boric acid compound only, which is then kneaded together with the phenolic compound and the epoxy resin, and (D) a method in which the boric acid compound and the phenolic compound are reacted with each other, and the obtained reaction product is applied onto the epoxy adduct using a spray drier or the like, which is then kneaded together with the epoxy resin. The surfaces of the epoxy adduct can be coated by using any method of preparing the epoxy resin composition.

When the epoxy resin composition is prepared without adding the phenolic compound, there may be employed (E) a method in which the epoxy adduct and the boric acid compound are separately added to the epoxy resin, and are kneaded by using a planetary mixer or a roll mill, or (F) a method in which the surfaces of the epoxy adduct are treated with the boric acid compound only, and is then kneaded together with the epoxy resin.

In preparing the epoxy resin composition of the present invention, the boric acid or the boric acid ester compound should be blended in an amount of 0.01 to 200 parts by weight and, preferably, in an amount of 0.5 to 40 parts by weight per 100 parts by weight of the epoxy adduct. When the amount of addition is smaller than 0.01 parts by weight, the latency cannot be maintained to a sufficient degree and when the amount of addition is greater than 200 parts by weight, on the other hand, the curing property becomes poor.

The surface-treated epoxy adduct should be blended in an amount of 0.5 to 50 parts by weight and, preferably, in an amount of 1 to 25 parts by weight per 100 parts by weight of the epoxy resin. In this case, suitable curing rate and latent curing property are maintained.

The phenolic compound is blended in an amount of 0.001 to 50 parts by weight and, preferably, in an amount of 0.05 to 10 parts by weight per 100 parts by weight of the epoxy resin. The optimum amount of addition varies depending upon the amount of boric acid or boric acid ester compound that is used at the same time. It is desired that the equivalent ratio of phenolic hydroxyl group to boric acid or boric acid ester is 1:0.2 to 1:5.

According to the present invention, furthermore, an epoxy resin composition that can be stably preserved is obtained even in a curing system in which other epoxy curing agents such as acid anhydrides are added to the above-mentioned epoxy resin composition. Representative examples of the curing agent used here includes acid anhydrides such as maleic anhydride, phthalic anhydride, trimellitic anhydride, pyromellitic anhydride, succinic anhydride, methylnadic anhydride and chlorendic anhydride, as well as dicyandiamide, acid hydrazides, diaminomaleonitrile, diallylmelamine and amineimides.

In preparing the epoxy resin composition, it is allowable to use, as required, an antioxidizing agent, granular and fibrous fillers of various kinds, and additives such as a plasticizer, a reactive diluent, a coloring agent, a viscosity-adjusting agent and like agents, in addition to the curing agent or the cure accelerating agent.

Contents of the present invention will now be concretely described by way of Examples. It need not be pointed out that in the present invention, the epoxy resins, amine compounds, nitrogen-containing heterocyclic compounds, phenolic compounds and silica used as starting materials are in no way limited to those described in Examples and Comparative Examples only.

In Examples of the present invention, furthermore, the epoxy adducts are prepared in compliance with a widely known method, and the components constituting the epoxy adducts that are used are described in parenthesis.

(1) Epoxy resin

Trade name: Epikote No. 828, produced by Yuka Shell Co.

Trade name: Epikote No. 152, produced by Yuka Shell Co.

Trade name: DER-438, produced by Dow Chemical Japan Co.

Trade name: DER-331J, produced by Dow Chemical Japan Co.

Trade name: ERL-4221, produced by Union Carbide Japan Co.

(2) Nitrogen-containing heterocyclic compound

Trade name: Curezol 2E4MZ, produced by Shikoku Kasei Kogyo Co. (2-ethyl-4-methylimidazole)

Trade name: Curezol 2PZ, produced by Shikoku Kasei Xogyo Co. (2-phenylimidazole)

Trade name: Curezol C17Z, produced by Shikoku Kasei Kogyo Co. (2-heptadecylimidazole)

Tradeame: Curezol C11Z, produced by Shikoku Kasei Kogyo Co. (2-undecylimidazole)

(3) Phenolic compound

Tradeame: Resitop PSM-4261, produced by Gun-ei Kagaku Kogyo Co.

Tradeame: Resin X, produced by Mitsubishi Yuka Co.

Tradeame: Resin M, produced by Maruzen Sekiyu Kagaku Co.

(4) Silica

Tradeame: Aerosii No. 380PE, produced by Japan Aerosii Co.

The surfaces were treated in compliance with the above-mentioned methods (A) to (D). The storage stability of the epoxy resin composition was evaluated in terms of a gelation time at 40° C. and the curing property of the epoxy resin was evaluated in terms of a gelation time at 150° C. The gelation time was found by a stroke-cure method on a heated steel plate maintained at a temperature of 40° C. or 150° C.

EXAMPLE 1

About 280 g of Curezol 2MZ was dissolved in 5 liters of methyl ethyl ketone with heating followed by the addition of a solution obtained by diluting about 690 g of epoxy resin DER-331J in 500 ml of methyl ethyl ketone. The mixture was refluxed and reacted for two hours. Then, the solvent was removed and the reaction product was finely pulverized to prepare about 950 g of an epoxy adduct.

On the other hand, 2.5 g of Resitop which is a phenolic compound used as a surface-treating agent was dissolved in 25 g of an epoxy resin. 475 Grams of the epoxy resin, 100 g of the above epoxy adduct, 4 5 g of tributyl borate, and 27.5 g of the above-mentioned epoxy resin in which has been dissolved the Resitop were weighed into a stainless steel pot and were mixed. The mixture was then kneaded at room temperature for about 15 minutes using a three-roll mill to prepare an epoxy resin composition for evaluation.

The gelation times of the obtained epoxy resin composition were measured to be 30 days or longer at 40° C. and 23 seconds at 150° C.

EXAMPLES 2 TO 7

By using the epoxy adducts shown in Table 1 obtained by the same method as that of Example 1 and by using the surface-treating agents shown in Table 1, the epoxy resins, epoxy adducts and surface-treating agents were treated at blending ratios shown in Table 1 in the same manner as in Example 1 to prepare epoxy resin compositions. The gelation times of the epoxy resin compositions were measured to be as shown in Table 1.

TABLE 1

| Example | 1 | 2 | 3 | 4 | 5 | 6 | 7 |
|---|---|---|---|---|---|---|---|
| Epoxy resin (Epikote = 828) | 100 | 100 | 100 | 100 | 100 | 100 | 100 |
| Epoxy adduct | | | | | | | |
| (Epikote = 828/2MZ) | 20 | | | | | | |
| (Epikote = 828/2MZ/bisphenol A) | | 20 | | | | | |
| (Epikote = 828/2MZ) | | | 20 | | | | |
| (Epikote = 828/2E4MZ) | | | | 20 | | | |
| (Epikote = 828/C11Z) | | | | | 20 | | |
| (DER-438/2E4MZ) | | | | | | 20 | |
| (ERL-4221/2E4MZ) | | | | | | | 20 |
| Surface-treating agent | | | | | | | |
| Trimethyl borate | 0.50 | 0.50 | | | | 0.50 | 0.50 |
| Tributyl borate | 0.90 | | | 0.90 | | | |
| Triphenyl borate | | | | | 1.10 | | |
| Resitop | 0.50 | 0.50 | 0.50 | 0.50 | 0.50 | 0.50 | 0.50 |
| Surface-treating method | A | A | A | A | A | A | A |
| Gelation time | | | | | | | |
| (sec/150° C.) | 23 | 72 | 62 | 25 | 95 | 23 | 23 |
| (days/40° C.) | >30 | >30 | >30 | >30 | 25 | >30 | >30 |

EXAMPLES 8 AND 9

By using the epoxy adduct shown in Table 2 obtained by the same method as that of Example 1 and by using the surface-treating agents shown in Table 2, the epoxy resin, epoxy adduct and surface-treating agents were treated at blending ratios shown in Table 2 in the same manner as in Example 1 to prepare epoxy resin compositions. The gelation times of the epoxy resin compositions were measured to be as shown in Table 2.

EXAMPLE 10

2.5 Grams of pyrogallol which is a phenolic compound serving as the surface-treating agent and 2.5 g of a trimethyl borate were dissolved in 40 ml of acetone with heating. Then, acetone was moderately removed by evaporation to obtain a mixture surface-treating agent. Next, 460 g of the epoxy resin, 100 g of the epoxy adduct (curing agent) and 5 g of the above mixture surface-treating agent were weighed into a stainless steel pot and were mixed in advance. The mixture was then mixed at room temperature for about 15 minutes using a three-roll mixer to prepare a sample for evaluation.

The gelation time of the obtained epoxy resin composition was measured to be 30 days or longer at 40° C. and 24 seconds at 150° C.

EXAMPLES 11 TO 14

By using the epoxy adduct shown in Table 2 obtained by the same method as that of Example 10 and by using the surface-treating agents shown in Table 2, the epoxy resin, epoxy adduct and surface-treating agents were treated at blending ratios shown in Table 2 in the same manner as in Example 10 to prepare epoxy resin compositions. The gelation times of the epoxy resin compositions were mea-

7 sured no be as shown in Table 2.

EXAMPLE 15

A solution obtained by dissolving 10 g of triethyl borate in 50 ml of acetone was spray-dried on 100 g of a fine powdery epoxy adduct (DER 331J/2E4MZ) by using a spray drier to obtain an epoxy adduct of which the surface has been treated.

To 500 g of the epoxy resin were then added 110 g of the above surface-treated epoxy adduct and 2.5 g of catechol. The mixture was kneaded at room temperature for 15 minutes using a three-roll mill to obtain a desired composition.

The gelation time of the resin was 30 days or longer at 40° C. and was 24 seconds at 150° C.

EXAMPLE 16

10 Grams of trimethyl borate and 10 g of Resitop were dissolved in 100 ml of acetone, which was then spray-dried onto 400 g of the adduct to obtain the adduct whose surface has been treated.

8

EXAMPLE 18

The epoxy resin, epoxy adduct and boric acid were mixed together at a blending ratio shown in Table 2 quite in the same manner as that of Example 1 but without using the phenolic compound, in order to prepare an epoxy resin composition. The gelation times of the thus obtained epoxy resin composition were measured to be as shown in Table 2.

EXAMPLE 19

The epoxy adduct of which the surfaces have been treated with methyl borate and the epoxy resin were mixed together at a blending ratio shown in Table 2 quite in the same manner as that of Example 15 but without using the phenolic compound, in order to prepare an epoxy resin composition. The gelation times of the thus obtained epoxy resin composition were measured to be as shown in Table 2.

TABLE 2

| Example | 8 | 9 | 10 | 11 | 12 | 13 | 14 | 15 | 16 | 17 | 18 | 19 |
| --- | --- | --- | --- | --- | --- | --- | --- | --- | --- | --- | --- | --- |
| Epoxy resin (parts) Epikote #828 | 100 | 100 | 100 | 100 | 100 | 100 | 100 | 100 | 100 | 100 | 100 | 100 |
| Epoxy adduct (parts) DE2331J/2E4MZ | 20 | 20 | 20 | 20 | 20 | 20 | 20 | 20 | 20 | 20 | 20 | 20 |
| Surface-treating agent (parts) | | | | | | | | | | | | |
| Trimethyl borate | 0.40 | 0.25 | 0.50 | | 0.46 | 0.20 | 0.50 | | 0.50 | | | 0.50 |
| Triethyl borate | | | | | | | | 0.50 | | 0.40 | | |
| Boric acid | | | | 0.33 | | | | | | | 1.0 | |
| Resitop | 0.80 | | | | | | | | 0.50 | | | |
| Resin X | | | | | 0.34 | | | | | 0.40 | | |
| Resin M | | | | | | 0.80 | | | | | | |
| Triphenolethane | | 0.75 | | | | | | | | | | |
| Gallic acid | | | | | | | | 0.50 | | | | |
| Pyrogallol | | | 0.50 | 0.67 | | | | | | | | |
| Catechol | | | | | | | | | 0.50 | | | |
| Surface-treating method | A | A | B | B | B | B | B | C | D | D | E | F |
| Gelation time | | | | | | | | | | | | |
| (sec/150° C.) | 23 | 26 | 24 | 21 | 25 | 22 | 23 | 24 | 26 | 23 | 24 | 71 |
| (days/40° C.) | >30 | >30 | >30 | 17 | 14 | >30 | >30 | >30 | >30 | >30 | 1 | >30 |

Then, 110 g of the surface-treated epoxy adduct was added to 500 g of the epoxy resin, and the mixture was kneaded at room temperature for 15 minutes using a three-roll mixer to obtain a desired composition.

The gelation time of the resin was 30 days or longer at 40° C. and was 26 seconds at 150° C.

EXAMPLE 17

By using the epoxy adduct shown in Table 2 obtained by the same method as that of Example 16 and by using the surface-treating agents shown in Table 2, the epoxy resin, epoxy adduct and surface-treating agents were treated at blending ratios shown in Table 2 in the same manner as in Example 16 to prepare epoxy resin compositions. The gelation times of the epoxy resin composition were measured to be as shown in Table 2.

EXAMPLES 20 TO 22

A variety of surface-treated epoxy adducts were obtained in the same manner as in Example 15.

Then, the epoxy resin, phenolic compounds, Aerosil and the epoxy adducts serving as the cure promoting agents were kneaded at blending ratios shown in Table 3 an room temperature for 15 minutes using a three-roll mixer. The kneaded product was then transferred to a planetary mixer followed by the addition of a predetermined amount of methylnadic anhydride which is a curing agent. The mixture was mixed with stirring under a reduced pressure for 30 minutes to obtain epoxy resin compositions. The gelation times of these epoxy resin compositions were measured to be as shown in Table 3.

EXAMPLES 23 AND 24

A variety of surface-treated epoxy adducts were obtained in the same manner as in Example 15.

Then, the epoxy resin, phenolic compounds, Aerosil, dicyandiamide as a curing agent and the epoxy adducts as a cure accelerating agents were kneaded at blending ratios shown in Table 3 at room temperature for 15 minutes using a three-roll mixer in order to prepare epoxy resin compositions. The gelation times of these epoxy resin compositions were measured to be as shown in Table 3.

EXAMPLES 25 AND 26

By using the epoxy adduct shown in Table 3 obtained by the same method as that of Example 1 and by using the surface-treating agents, the epoxy resin, curing agent, epoxy adduct and surface-treating agents were treated at blending ratios shown in Table 3 in the same manner as in Example 1 to prepare epoxy resin compositions. The gelation times of the epoxy resin compositions were measured to be as shown in Table 3.

TABLE 3

| Example | 20 | 21 | 22 | 23 | 24 | 25 | 26 |
|---|---|---|---|---|---|---|---|
| Epoxy resin (parts) | | | | | | | |
| Epikote = 828 | 100 | 100 | | 100 | 100 | 100 | 100 |
| DER-331J | | | 100 | | | | |
| Curing agent (parts) | | | | | | | |
| Methylnadic anhydride | 85 | 85 | 85 | | | 85 | 85 |
| Dicyandiamide | | | | 4 | 4 | | |
| Cure promoting agent (parts) | | | | | | | |
| (DER-438/2E4MZ) | 6 | | | 5 | 5 | 6 | 6 |
| (Epikote = 152/2E4MZ) | | 6 | | | | | |
| (DER-438/2PZ) | | | 6 | | | | |
| Surface-treating agent (parts) | | | | | | | |
| Trimethyl borate | 4 | 5 | 5 | 5 | 5 | 4 | |
| Pyrogallol | 5 | 5 | | 5 | | | 5 |
| Catechol | | | 4 | | | | |
| Resitop | | | | | 2 | | |
| Aerosil (parts) | 3 | 3 | 3 | 2 | 2 | 3 | 3 |
| Surface-treating method | C | C | C | C | C | A | A |
| Gelation time | | | | | | | |
| (sec/150° C.) | 330 | 320 | 250 | 96 | 82 | 305 | 320 |
| (days/40° C.) | >30 | >30 | >30 | >30 | >30 | 5 | 2 |

COMPARATIVE EXAMPLES 1 AND 2

An epoxy adduct of a composition shown in Table 4 serving as a curing agent or an imidazole compound was mixed at a blending ratio as shown in Table 4 to prepare an epoxy resin composition. The gelation times of the epoxy resin composition were measured to be as shown in Table 4.

COMPARATIVE EXAMPLE 3

An epoxy resin composition was prepared quite in the same manner as in Example 1 but without adding the boric acid compound. The gelation times of the epoxy resin composition were measured to be as shown in Table 4.

TABLE 4

| Comparative Example | 1 | 2 | 3 |
|---|---|---|---|
| Epoxy resin | | | |
| Epikote = 828 | 100 | 100 | 100 |

TABLE 4-continued

| Comparative Example | 1 | 2 | 3 |
|---|---|---|---|
| Curing agent Adduct | | | |
| ERL-4221 (5.1 parts) $C_{17}Z$ (6.1 parts) Pyrogallol (2.0 parts) Boric acid (1.8 parts) | 15 | | |
| Curezol $C_{17}Z$ | | 6.1 | |
| Adduct (Epikote = 828/2E4MZ) | | | 20 |
| Resitop | | | 1 |
| Gelation time | | | |
| (sec/150° C.) | >1800 | 155 | 23 |
| (days/40° C.) | >30 | >30 | 1 |

When an epoxy adduct is used as a curing agent or is used as a cure accelerating agent for other curing agents, boric acid or a boric acid ester compound and a phenolic compound are made present together with the epoxy adduct in the epoxy resin composition, so that the epoxy resin composition exhibits favorable storage stability and curing property. The epoxy resin composition of the present invention, therefore, can be used as an adhesive, a sealant, an ink, a painting material and the like.

We claim:
1. An epoxy resin composition comprising an epoxy resin and, as essential components, (1) an epoxy adduct obtained by the reaction of an epoxy compound having at least one epoxy group in one molecule with any one of a nitrogen-containing heterocyclic compound, an aliphatic amine or an aromatic amine; (2) a borate ester selected from the group consisting of trimethyl borate, triethyl borate, tripropyl borate, tributyl borate, trioctyl borate, triphenyl borate, and tricresyl borate; and (3) a phenolic compound.

2. The epoxy resin composition of claim 1 wherein the epoxy adduct is in the form of fine granules and wherein the borate ester and the phenolic compound are present in the form of a coating on the surface of the fine granules.

3. The epoxy resin composition of claim 1 wherein the epoxy adduct comprises the nitrogen-containing heterocyclic compound.

4. The epoxy resin composition of claim 3 wherein the nitrogen-containing heterocyclic compound is selected from the group consisting of imidazole, 2-ethyl-4-methylimidazole, 2-methylimidazole, 2-phenylimidazole, 2-undecylimidazole, 2-heptadecylimidazole, 2-phenyl-4-methyl-5-dihydroxymethylimidazole, 2-phenyl-4,5-dihydroxymethylimidazole, mercaptobenzothiazoles, 1-(2-hydroxyethyl)-2-methylimidazole and 1-(2-hydroxyethyl)-2-phenylimidazole.

5. The epoxy resin composition of claim 1 wherein the epoxy adduct is obtained by the reaction of the epoxy compound with an aliphatic amine or an aromatic mine.

6. The epoxy resin composition of claim 5, wherein the aliphatic amine or aromatic amine is selected from the group consisting of diethylenetriamine, triethylenetetramine, tetraethylenepentamine, iminobispropylamine, bis(hexamethylene)triamine, diaminodiphenylmethane, metaphenylenediamine and 3,9-bis(3-aminopropyl)-2,4,8,10-tetroxaspiro [5,5] undecane.

7. The epoxy resin composition of claim 1 wherein the phenolic compound is selected from the group consisting of catechol, 4-t-butyl catechol, pyrogallol, resorcinol, hydroquinone, phloroglucinol, bisphenol A, bisphenol F, dihydroxybiphenyl, dihydroxynaphthalene, 1,1,1-tris(4-hydroxyphenyl)ethane and bis(4-hydroxyphenol)sulfone.

8. The epoxy resin composition of claim 1 wherein the phenolic compound is a novolac-phenol resin, a resol-phenol resin or poly(vinyl phenol).

9. The epoxy resin composition of claim 1 which comprises from 0.01 to 200 parts by weight per 100 parts by weight of the epoxy adduct of the borate ester and from 0.001 to 50 parts by weight per 100 parts by weight of the epoxy resin of the phenolic compound.

10. The epoxy resin composition of claim 1 which comprises from 0.5 to 40 parts by weight of the borate ester per 100 parts by weight of the epoxy adduct and from 0.05 to 10 parts by weight of the phenolic compound per 100 parts by weight of the epoxy resin.

11. The epoxy resin composition of claim 1 wherein the borate ester and phenolic compound are applied to the surface of the epoxy adduct and wherein the surface-treated epoxy adduct is blended in an amount of 0.5 to 50 parts by weight per 100 parts by weight of the epoxy resin.

12. The epoxy resin composition of claim 11 which comprises from about 1 to 25 parts by weight of the surface-treated epoxy adduct per 100 parts by weight of the epoxy resin.

13. The epoxy resin composition of claim 9 wherein the equivalent ratio of phenolic hydroxyl group to the boric acid compound is 1:0.2 to 1:5.

* * * * *